(12) United States Patent
Beck et al.

(10) Patent No.: US 7,121,369 B2
(45) Date of Patent: Oct. 17, 2006

(54) FRAME FOR MULTIPLE VEHICLE HEAT EXCHANGERS

(75) Inventors: Ralf Beck, Reutlingen (DE); Werner Nitsche, Teck (DE); Roland Strähle, Unerensingen (DE); Jens Nies, Holzgerlingen (DE); Heinrich Rockenfeller, Kirchentellinsfurt (DE); Wilfried Bittner, Filderstadt (DE)

(73) Assignee: Modine Manufacturing Company, Racine, WI (US)

( * ) Notice: Subject to any disclaimer, the term of this patent is extended or adjusted under 35 U.S.C. 154(b) by 225 days.

(21) Appl. No.: 10/695,373

(22) Filed: Oct. 28, 2003

(65) Prior Publication Data

US 2004/0188061 A1 Sep. 30, 2004

(30) Foreign Application Priority Data

Oct. 29, 2002 (DE) ................................ 102 50 334

(51) Int. Cl.
*B60K 11/04* (2006.01)
(52) U.S. Cl. ...................... 180/68.4; 165/41; 165/149; 248/232
(58) Field of Classification Search ............... 180/68.4, 180/68.6; 165/41, 51, 67, 140, 149, 906, 165/DIG. 443; 248/232, 233, 234, 213.3; 411/32
See application file for complete search history.

(56) References Cited

U.S. PATENT DOCUMENTS

| | | | | |
|---|---|---|---|---|
| 4,485,531 A | * | 12/1984 | Murphy | ....................... 24/297 |
| 4,583,338 A | * | 4/1986 | Sewell et al. | .................. 52/456 |
| 5,123,695 A | * | 6/1992 | Kanemitsu et al. | .... 296/193.09 |
| 5,671,803 A | * | 9/1997 | Tepas et al. | ................... 165/41 |
| 6,158,500 A | * | 12/2000 | Heine | ........................... 165/67 |
| 6,470,961 B1 | * | 10/2002 | Case | ........................... 165/78 |

* cited by examiner

*Primary Examiner*—Christopher P. Ellis
*Assistant Examiner*—John Walters
(74) *Attorney, Agent, or Firm*—Wood, Phillips, Katz, Clark & Mortimer (57) ABSTRACT

A frame supports heat exchangers one in front of another in the direction of flow of cooling air, and includes two vertical walls interconnected by transverse walls, cross braces between the walls, and fastening points on the walls adapted to fasten the heat exchangers to the frame. Outwardly extending bulging sections in the vertical walls include an outer portion adapted to be secured to the vehicle support members to support the frame thereon, and an inner portion defining a space between vertical wall sections above and below the bulging section for receive projecting components of at least one heat exchanger. Connectors connect each of the fastening openings to the aligned flange openings, with the connectors including a head and a stem with an expandable end opposite the head retaining the connectors in the aligned openings. Hooks support the heat exchangers in the direction of air flow, with the connector stems supporting against at least some forces transverse to the direction of air flow.

11 Claims, 8 Drawing Sheets

FRAME FOR MULTIPLE VEHICLE HEAT EXCHANGERS

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention is directed toward heat exchangers for vehicles, and particularly toward a supporting frame for multiple heat exchangers used with vehicles

BACKGROUND OF THE INVENTION AND TECHNICAL PROBLEMS POSED BY THE PRIOR ART

In many different applications, a plurality of heat exchangers are used with one or more systems present in the application. Particularly in vehicular applications, for example, it is desirable to minimize the size and weight of the heat exchangers and their supporting structure.

Therefore, frames have been provided which support a number of different heat exchangers together in a relatively compact space, and in an environment where air flows advantageously over all of the heat exchangers to provide advantageous, required heat exchange for all of the systems. Typically, such frames have consisted of rectangular, straight-walled box structures on which the different heat exchangers can be fixed. Further, in many applications, strength requirements necessitate the inclusion of braces across the frame, which braces can interfere with the flow of cooling air through the supported heat exchangers. Still further, particularly with rectangular frames, air flow across the entire heat exchange surfaces has been difficult to achieve.

The connection of heat exchangers to such prior art frames has, moreover, been difficult. On the one hand, particularly when used, for example, in vehicular applications, the entire assembly will be subject to frequent vibrations and other similar changing loads, necessitating that a rigid, secure connection between the frame and the heat exchangers be provided. On the other hand, desirable rapid and simple assembly and disassembly of the heat exchangers has been difficult to achieve while still providing a structure which will provide a reliable support over long periods of time notwithstanding vibrations and changing loads, and further notwithstanding the need to prevent or suppress clattering noises potentially caused by vibrations.

The present invention is directed toward overcoming one or more of the problems set forth above.

SUMMARY OF THE INVENTION

In one aspect of the present invention, a frame adapted to support a plurality of heat exchangers one in front of another in the direction of flow of cooling air is provided, where at least one of said heat exchangers is generally box shaped with projecting components on opposite sides thereof. The frame includes two vertical walls interconnected at upper and lower ends by two transverse walls, cross braces between the walls, and fastening points on the walls adapted to fasten the heat exchangers to the frame. The vertical walls include outwardly extending bulging sections, with the bulging sections each including an outer portion adapted to be secured to the vehicle support members to support the frame thereon, and an inner portion defining a space between vertical wall sections above and below the bulging section and adapted to receive the projecting components of the at least one heat exchanger.

In one form of this aspect of the present invention, the outer portions of the bulging sections include downwardly facing surfaces adapted to be secured on top of the vehicle support members.

In another form of this aspect of the present invention, the frame is adapted to support a first of the heat exchangers on one side of the cross braces and to support a second of the heat exchangers on the opposite side of the cross braces.

In still another form of this aspect of the invention, the cross braces are between two of the heat exchangers, and include cross brace sections between the vertical wall sections above and below the bulging section.

In another aspect of the present invention, a heat exchanging element is provided for a vehicle including a plurality of heat exchangers, one in front of another in the direction of flow of cooling air, and includes first and second heat exchangers, connecting flanges on each of the heat exchangers, each of the connecting flanges including an opening therethrough, and a supporting frame. The supporting frame includes two vertical walls interconnected at upper and lower ends by two transverse walls, cross braces between the walls, supports securable to support members on the vehicle, and at least one fastening opening on the walls for each of the heat exchangers, wherein each of the fastening openings is aligned with the flange openings. Connectors connect each of the fastening openings to the aligned flange openings, with the connectors including a head and a stem with an expandable end opposite the head retaining the connectors in the aligned openings.

In one form of this aspect of the invention, outwardly extending bulging sections are provided in the vertical walls, the bulging sections each including the supporting frame supports and defining a space between vertical wall sections above and below the bulging section, and inlet and outlet connectors of the heat exchangers are positioned in the space defined by the bulging sections.

In another form of this aspect of the invention, the cross braces are between two of the heat exchangers and include cross brace sections between the vertical wall sections above and below the bulging section.

In still another form of this aspect of the invention, the cross braces are spaced flat members interconnected by flat bracing members, with the flat members and flat bracing members generally lying in planes parallel to the direction of flow of cooling air through the heat exchangers. In a further form, at least some of the flat members and flat bracing members are oriented to direct air flow toward the corners of the supporting frame.

In yet another form of this aspect of the invention, mounts on the frame cooperate with hooks on the heat exchangers to support the heat exchangers on the frame. In a further form, the mounts and cooperating hooks support the heat exchangers on the frame in one direction, and the connectors support the heat exchangers on the frame in a second direction, with the first and second directions not parallel to one another. In a still further form, the mounts and cooperating hooks supporting one of the heat exchangers permit thermal expansion in a direction transverse to the stem of the connector connecting the flange opening of the one heat exchanger to the frame.

In still another aspect of the present invention, a frame is provided which is adapted to support a plurality of heat exchangers one in front of another in the direction of flow of cooling air, with the cooling air flowing from a front side of the frame to a back side across heat exchange surfaces of the heat exchangers supported between the frame sides. The frame includes two vertical walls interconnected at upper and lower ends by two transverse walls, the walls extending between the front and back sides, cross braces between the walls, fastening points on the walls adapted to fasten the heat exchangers to the frame, supports securable to support members on a vehicle, and a fan shroud securable to one of the fastening points at the back side of the frame by at least one releasable connector.

In one form of this aspect of the present invention, mounts are provided on the frame which cooperate with hooks on the fan shroud to support the fan shroud on the frame. In a further form, the mounts, cooperating hooks and at least one releasable connector support the fan shroud on the frame in the direction of cooling air flow, with the fan shroud including an outer edge overlapping the walls to support the fan shroud on the walls transverse to the direction of cooling air flow.

DETAILED DESCRIPTION OF THE INVENTION

Various aspects of the invention are included in the single embodiment illustrated in the figures.

A frame 20 for supporting a plurality of heat exchangers is illustrated in the drawings. Particularly in FIG. 1, it can be seen that the frame 20 consists of two vertical (side) walls 22, 24, interconnected at upper and lower ends by top and bottom transverse walls 26, 28. The transverse walls 26, 28 are shorter than the vertical walls 22, 24, although it should be understood that they could alternatively be the same length as, or longer than, the vertical walls 22, 24 within the scope of the invention. In a vehicle, for example, the vertical walls 26, 28 may be supported on frame body members 32 (see FIG. 1), with the transverse walls 26, 28 arranged in the transverse direction of the vehicle.

Figure 1:
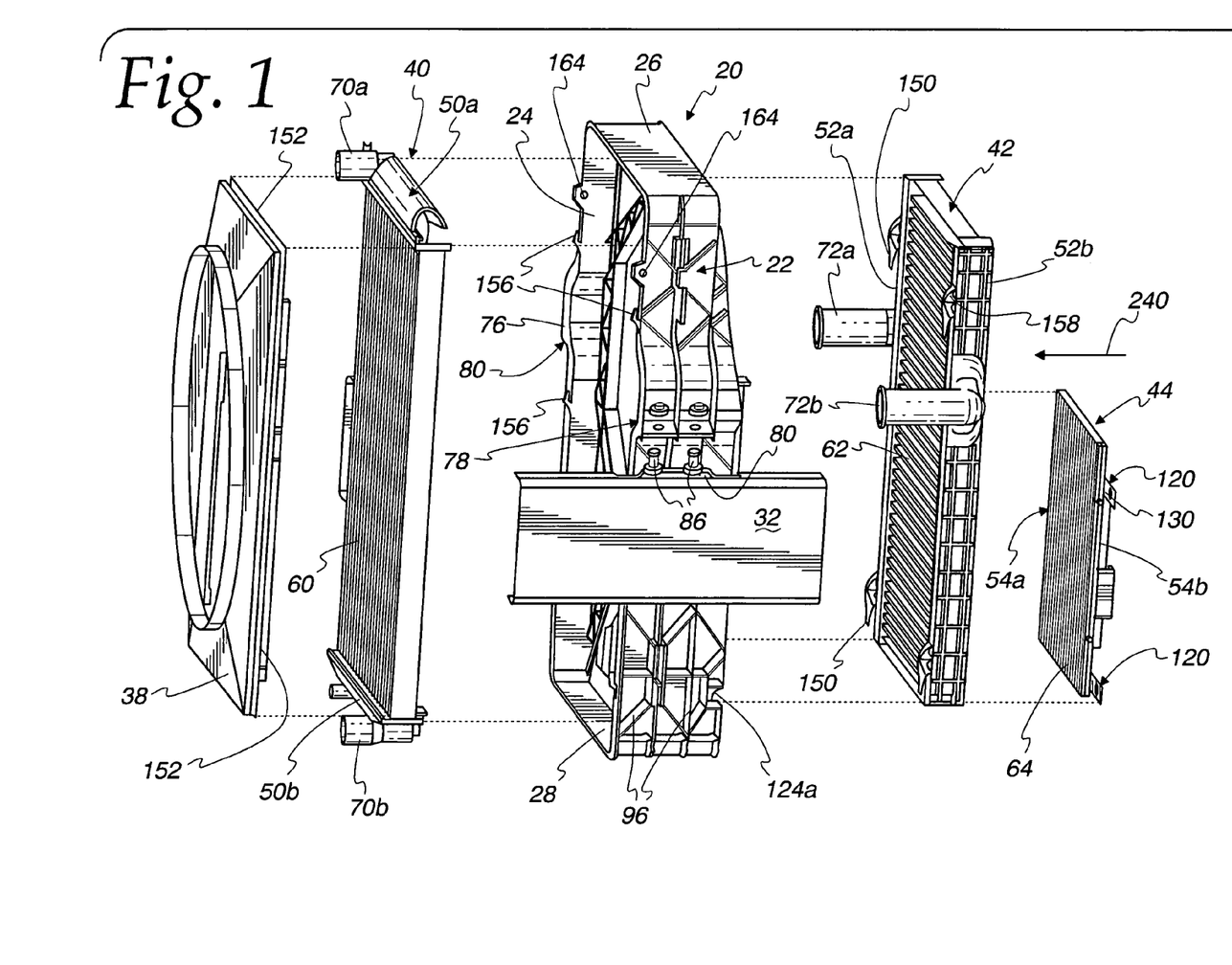
FIG. 1 is an exploded view of a frame embodying the present invention, supported on a vehicle frame member and illustrating heat exchangers and a fan shroud in accordance with at least some aspects of the present invention.

A fan shroud 38 may be provided at one end of the structure, for example, behind the heat exchanger arrangement viewed in the direction of travel of the vehicle, whereby a fan associated with the shroud 38 draws cooling air through the heat exchanger arrangement and blows out the heated cooling air to the rear. This will assist in providing uniform flow through the heat exchangers, and the dynamic pressure occurring during vehicle operation can also be made more effective.

As best shown in FIG. 1, the heat exchanger arrangement of the embodiment shown in the Figures includes three heat exchangers: a radiator 40, a charge air cooler 42, and a condenser 44 (e.g., for the vehicle air conditioner). It should be understood, however, that the present invention may be used with a plurality of many different heat exchangers, and is not restricted to the particular heat exchangers 40, 42, 44 shown. With the described air flow, cooling air will initially flow through the condenser 44, then the charge air cooler 42, and finally the radiator 40, although this sequence could be changed within the scope of the present invention. All three heat exchangers 40, 42, 44 are suitably secured to the frame 20 such as described in greater detail hereafter.

Each heat exchanger 40, 42, 44 consists of two opposite collecting tanks (50a, 50b for radiator 40, 52a, 52b for charge air cooler 42, and 54a, 54b for condenser 44), which tanks are connected by tubes (60 for radiator 40, 62 for charge air cooler 42, and 64 for condenser 44). In the illustrated embodiment, the collecting tanks 52a, 52b, 54a, 54b for the charge air cooler 42 and condenser 44 are arranged vertically, whereas the collecting tanks 50a, 50b of the radiator 40 are arranged horizontally. As a result, the tubes 60 of the radiator 40 are arranged across the tubes 62 of the charge air cooler 42.

Suitable ribs or fins (e.g., serpentine or plate fins) may be disposed between the tubes 60, 62, 64, whereby cooling air may flow between the fins (not shown) to facilitate heat exchange such as is known in the art. Each heat exchanger 40, 42, 44 also includes suitable inlet and outlet connectors (e.g., 70a, 70b for radiator 40 and 72a, 72b for charge air cooler 42) associated with selected ones of the collecting tanks. In the illustrated embodiment, the charge air cooler 42 may necessarily include inlet and outlet connectors 72a, 72b of a significant dimension in order to accommodate the necessary volume flow of charge air through the cooler 42.

In accordance with one aspect of the present invention, the opposite vertical walls 22, 24 include outwardly bulging sections 76, 78. The outer portions of the bulging sections 76, 78 may include a downwardly facing surface 80 (see FIGS. 1 and 2) which may be suitably secured to and supported on frame body members 32 to secure the frame 20 and entire assembly in the environment (e.g., in the vehicle). For example, suitable openings 84 (see FIG. 3) may be provided in the bulging sections 76, 78, with suitable connectors 86 (see FIG. 1) such as described below used to secure the bulging sections 76, 78 to the frame body members 32.

The bulging sections 76, 78 define spaces in open inner portions 88, 90 of the sides of the frame 20 beyond the otherwise generally box-like configuration of the frame 20 in which the relatively large inlet and outlet connectors 72a, 72b of the charge air cooler 42 (and which project outwardly from the generally box shape of the charge air cooler 42) may fit. As a result, a vary compact layout of the heat exchanger arrangement may be achieved. Of course, still other components of the heat exchangers 40, 42, 44 could be arranged or accommodated in such open inner portions. Further, it should be appreciated that the open inner portions 88, 90 need not be provided at the same height along the vertical walls 22, 24, and therefore bulging sections could be provided at different positions to correspond to the position of components of the heat exchangers to be supported in the frame.

Suitable stiffening ribs 96 may be provided with the frame 20 as illustrated in order to provide the requisite strength in a light weight construction.

In accordance with one aspect of the invention, suitable braces 100 may also be provided between the walls 22, 24, 26, 28 of the frame 20 for strength purposes. The braces 100 may advantageously be formed, for example, in a honeycomb-like hexagon to provide light weight stability, and may include generally vertically oriented braces 100a (see FIG. 2) providing support across the open inner portions 88, 90 of the bulging sections 76, 78.

Figure 2:
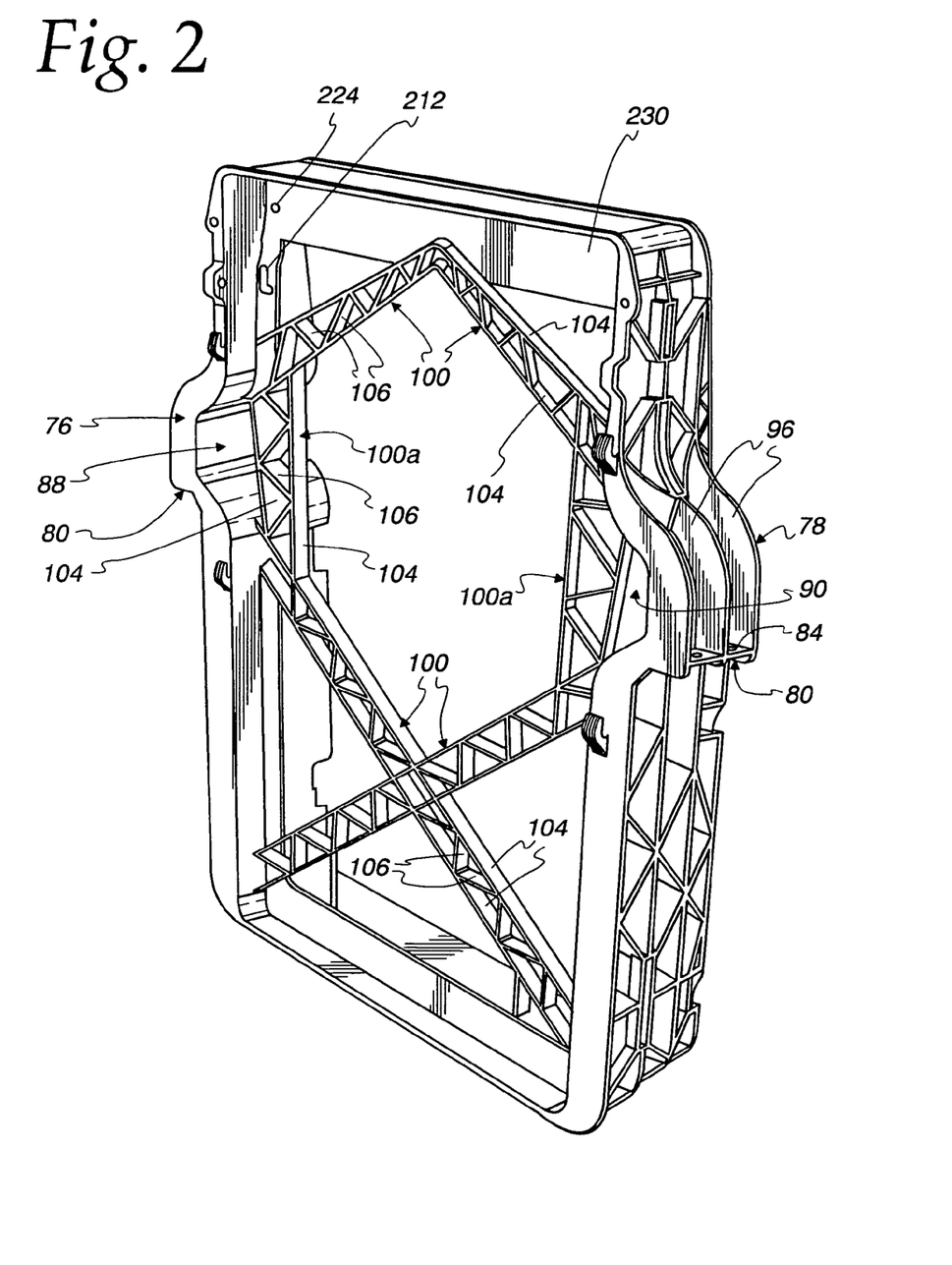
FIG. 2 is a perspective view of the frame of FIG. 1.
Figure 3:
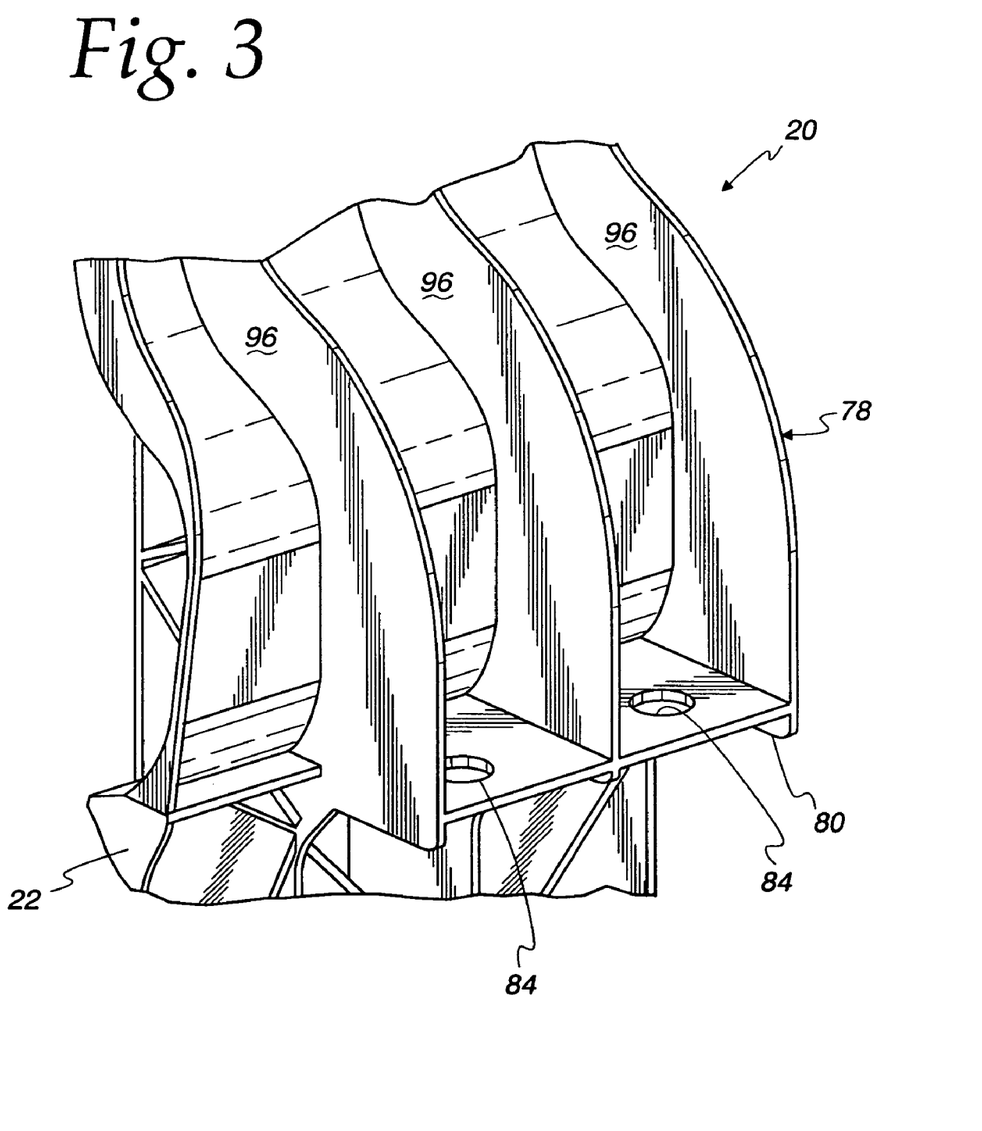
FIG. 3 is an enlarged perspective view of a portion of the frame.

The honeycomb-like braces 100 may also advantageously be configured whereby the braces 100 consist of spaced flat members 104 interconnected by flat bracing members 106, with the flat members 104, 106 generally lying in planes parallel to the direction of flow of cooling air through the heat exchangers 40, 42, 44, so as to provide only minimal interference with the flow of cooling air. Moreover, the flat members 104, 106 may be advantageously disposed with a slight angle of attack relative to the direction of flow of cooling air so as to guide that flow, for example, toward corners of the frame 20 where air flow might otherwise be less than through the center of the frame 20.

The entire frame 20 with its bracing members may advantageously be a one-piece part produced from plastic.

FIGS. 4–9 illustrate various connections or fastening points between the frame 20 and heat exchangers 40, 42, 44 whereby the heat exchangers 40, 42, 44 may be advantageously securely mounted to the frame 20 even in the face of vibrations and other changing forces such as may frequently encountered in, for example, vehicular applications, which mounting may at the same time be quickly and easily assembled and disassembled.

Figure 4:
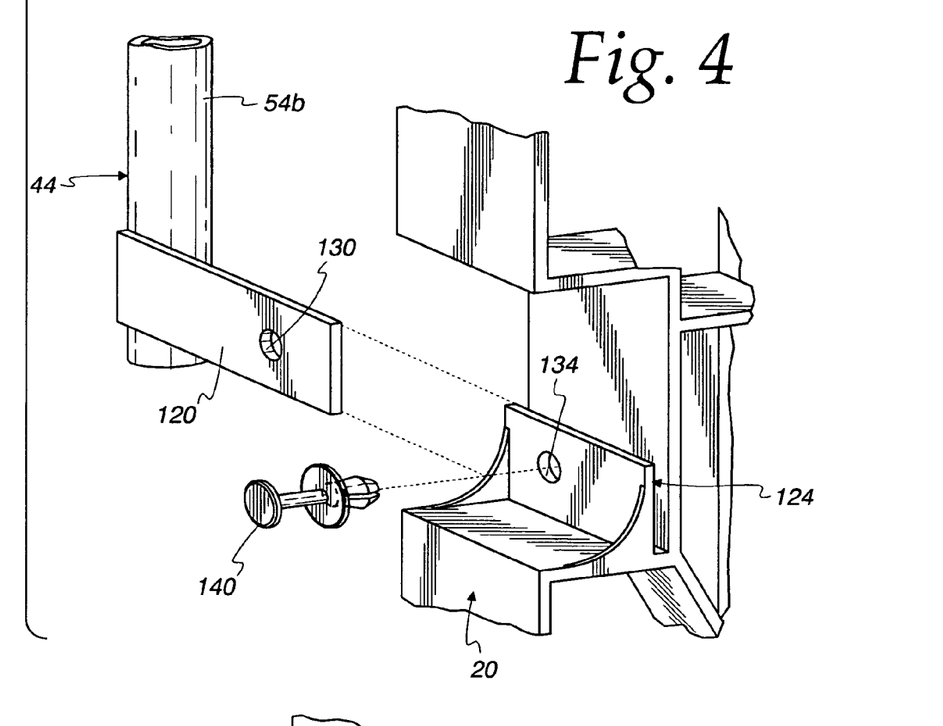
FIGS. 4–5 are partial perspective views illustrating one connecting configuration which may be used in accordance with the present invention.
Figure 5:
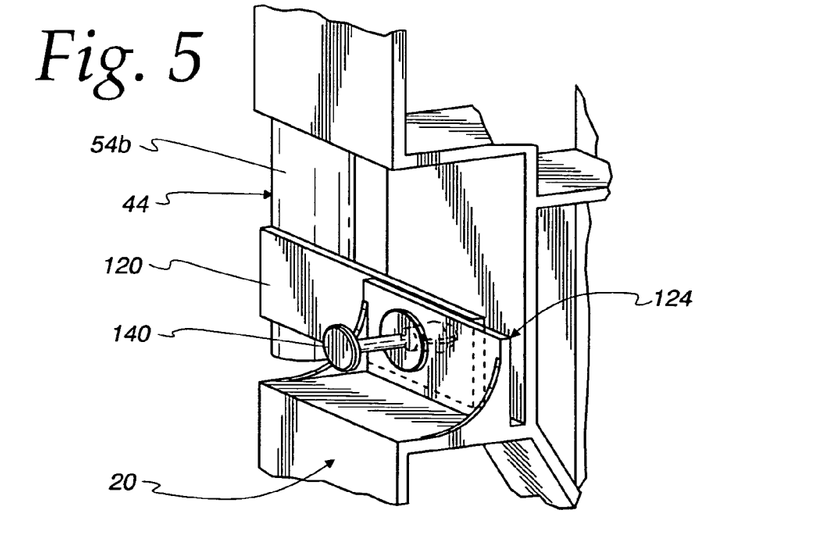

As illustrated in FIGS. 4–5, a plate clamp 120 may be advantageously secured to one of the heat exchangers (e.g., on the condenser 44, on a collecting tank 54b as illustrated in FIGS. 4–5 or, where appropriate, suitable mounting bracket or the like). The frame 20 includes suitable lateral mounting hooks or slots 124 therein adapted to receive the plate clamps 120, with each having openings 130, 134 therein which may be aligned when the clamps 120 are positioned in the slots 124, with suitable connectors 140 (such as the illustrated dowel-like connectors 140, which are described further below) received through the aligned openings 130, 134 (though not seen in the drawings, it should be appreciated that additional openings may also be provided (e.g. in the back wall of the slot 124) for receiving the connector 140 as may be necessary depending on the form of the connector.

In one advantageous form, four plates 120 (only two of which are seen in FIG. 1) may be provided, with four associated slots 124 provided in the frame 20, with the four slots 124 arranged in a rectangular configuration around the frame 20, with two horizontally aligned upper slots arranged directly above two horizontally aligned lower slots. All four slots 124 may be advantageously disposed in roughly the same vertical plane. It should be appreciated that in some applications a connector 140 may not be required for each connection, in which case assembly and disassembly may be particularly facilitated.

Figure 6:
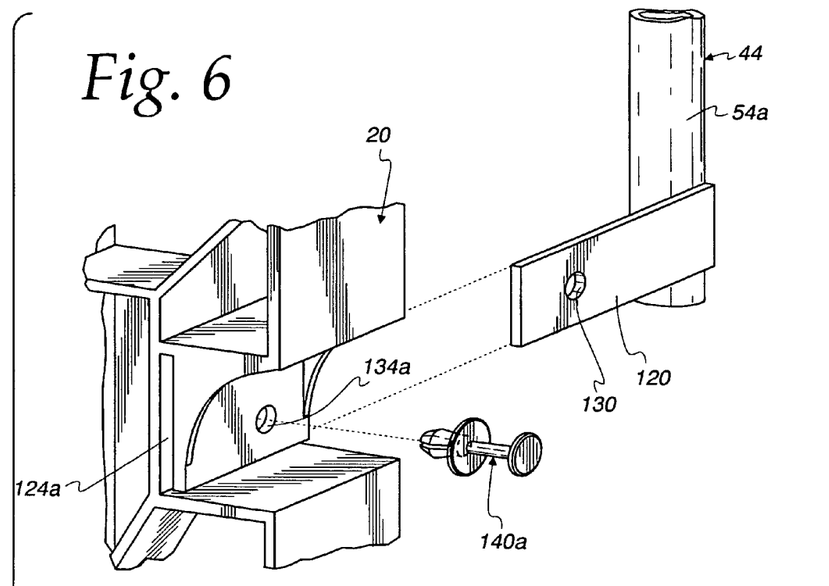
FIGS. 6–7 are partial perspective views illustrating another connecting configuration which may be used in accordance with the present invention.
Figure 7:
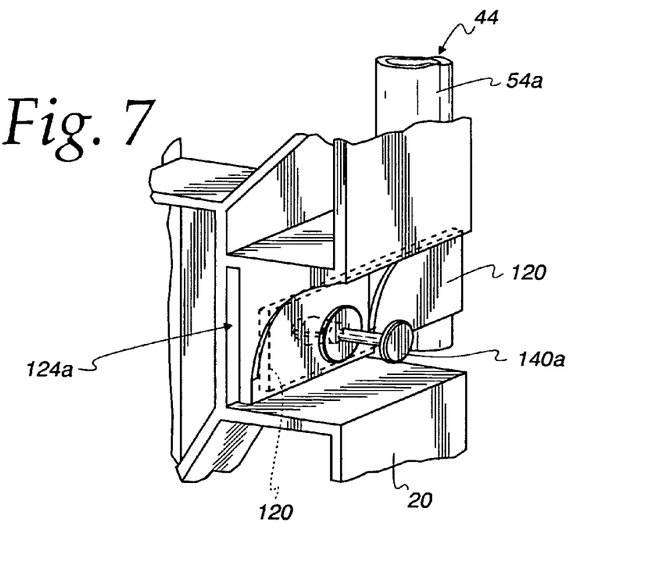

FIGS. 6–7 illustrate another form of hooks or slots 124a which may be used to mount plate clamps 120. With this configuration, the slot 124a may be closed on the top and bottom to provide additional security against the plate 120 improperly moving up and/or down out of the slot 124a. As with the FIGS. 4–5 arrangement, openings 130, 134a may be aligned with suitable connectors 140a projecting through the openings 130, 134a to further secure the plates 120 to the frame 20.

The FIGS. 6–7 configuration may be used in conjunction with the FIGS. 4–5 configuration, where plates 120 may first be moved laterally into the slots 124a, with the heat exchanger 44 then tipped up slightly so that the plates 120 on the opposite side of the heat exchanger 44 may first be positioned above the FIGS. 4–5 slots 124, and then tipped down to move the plates 120 into the FIGS. 4–5 slots 124.

It should be appreciated that connections such as shown in FIGS. 4–7 will advantageously allow for thermal expansion and contraction during use.

Figure 8:
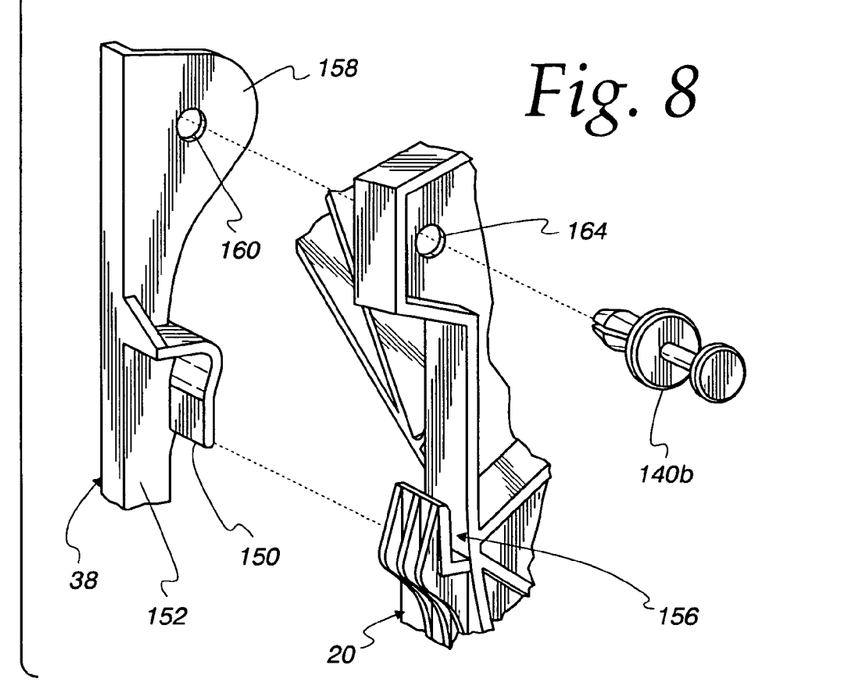
FIGS. 8–9 are partial perspective views illustrating a third connecting configuration which may be used in accordance with the present invention.
Figure 9:
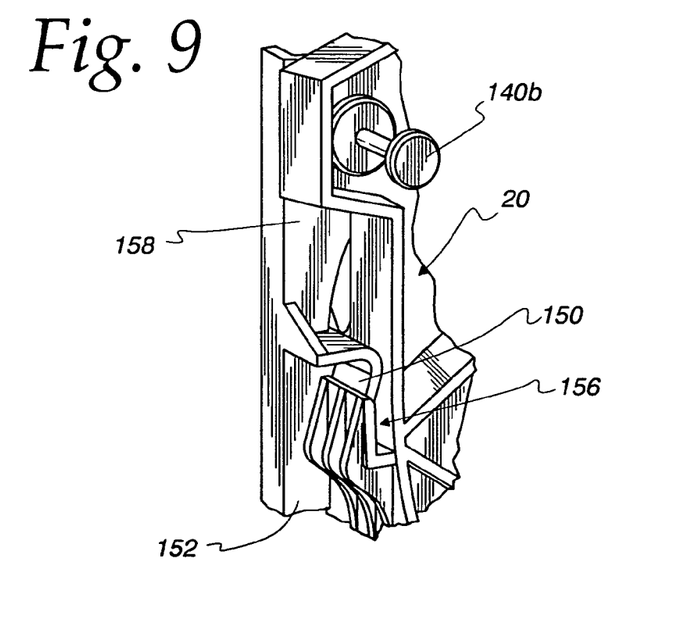

FIGS. 8–9 illustrate yet another connection structure such as may be used to advantageously connect the fan shroud 38 to the frame 20. Specifically, four downwardly open hook supports 150 are advantageously provided around an outer perimeter wall 152 which may advantageously mate closely with (and overlap with) the downstream end of the frame 20. The wall 152 may thus take up substantially all forces on the shroud 38 which may be transverse to the direction of the cooling air flow. Further, this mating assists in minimizing undesired outflow of cooling air and minimizing the drawing of "false air" through the shroud (i.e., air drawn by the fan which does not pass through the heat exchangers 40, 42, 44).

The downwardly open hook supports 150 may be arranged in a generally rectangular configuration in a generally vertical plane on the inside of the perimeter wall 152. As shown in FIGS. 8–9, the fan shroud 38 (only the perimeter wall of which is shown in these figures) may be dropped down into matching upwardly open slots 156 on the frame 20 (as best seen on the frame 20 in FIG. 1) on the downstream side of the frame 20.

A side flange 158 associated with the downwardly open hook support 150 overlaps with a portion of the frame 20 in the direction of air flow, and aligned openings 160, 164 may be suitably secured together, as by use of connectors 140b such as previously described (and further described below). Use of only two connectors 140b (one on either side) at the connection of the top two hook supports 150 may be sufficient to suitably secure the fan shroud 39 to the frame 20.

Figure 10:
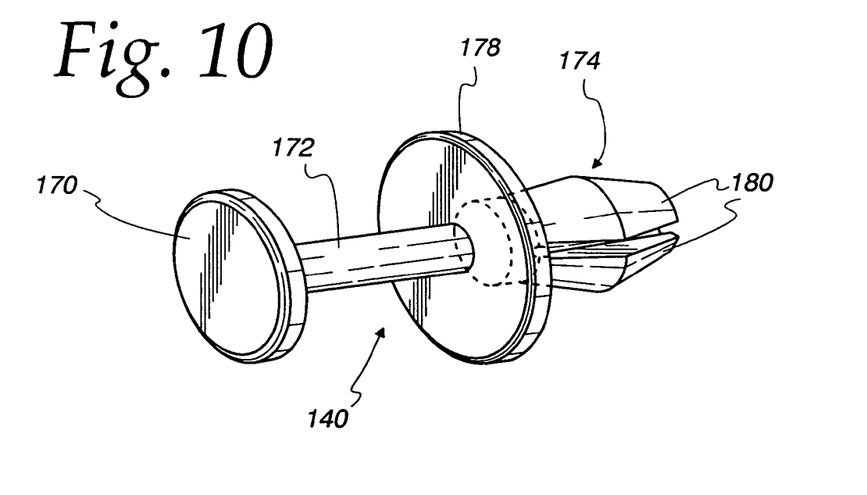
FIGS. 10–11 are perspective views of a connector which may be used with the present invention.
Figure 11:
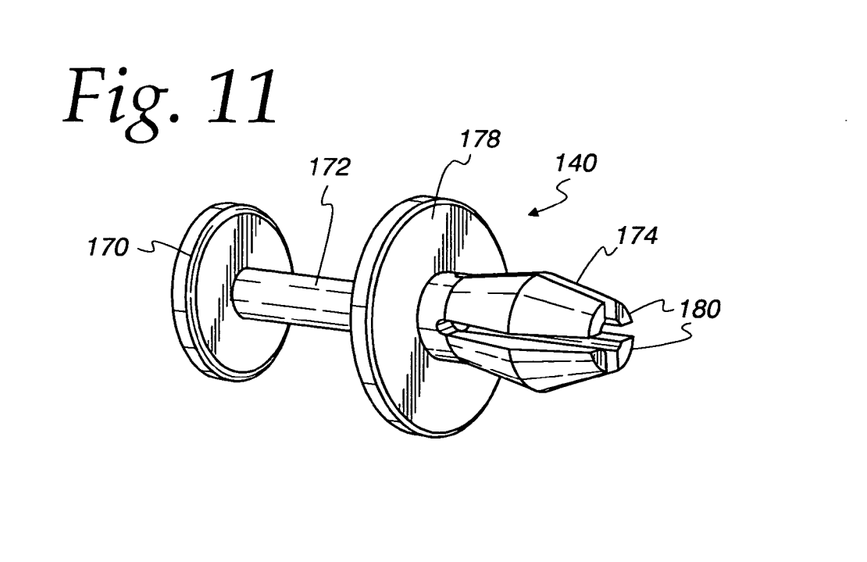

Suitable connectors 140 are illustrated in FIGS. 10–11. In the illustrated connectors 140, a head 170 is secured to one end of a stem 172 and an expandable foot 174 is on a flange 178 secured to the stem 172 opposite the head 170. The foot 174 includes legs 180 which may be biased inwardly as they are pushed into an opening (e.g., 130, 134, 160, 164) to enable them to clear through the openings, and then spring back outwardly once clear of the openings so that they will prevent the connector 140 from coming back out of the openings when faced with the varied loads and vibrations such as may be encountered in many applications. The ends of the legs 180 facing the flange 178 are tapered, however, so that the legs 180 will be forced together again (via engagement with the wall around the opening) when a sufficient force is applied to the connector 140 to remove it from the openings.

Figure 12:
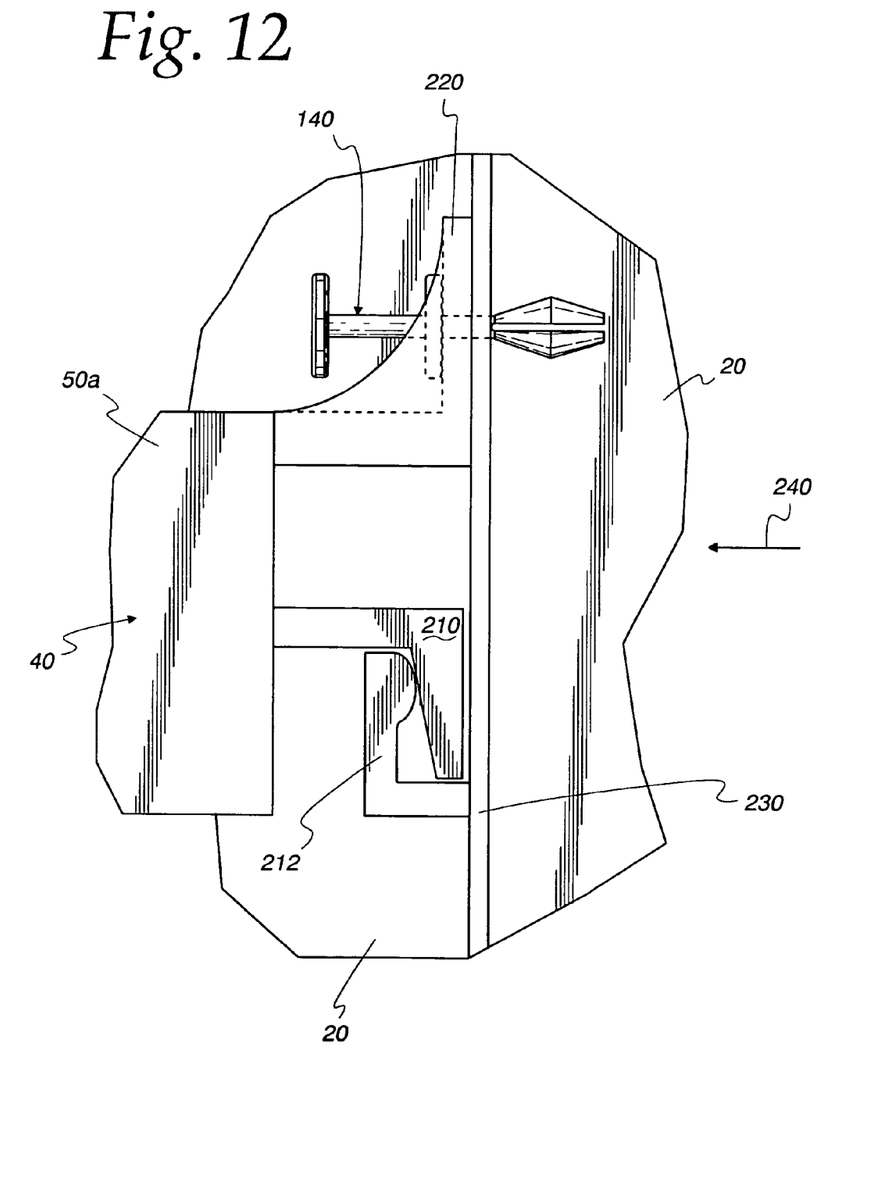
FIG. 12 is a partial side view of a fourth connecting configuration which may be used in accordance with the present invention.

A suitable connection, such as may be used to connect the radiator 40 and/or charge air cooler 42 to the frame 20 in accordance with the present invention is illustrated in FIG. 12. Such heat exchangers 40, 42 (reference numeral 40 is used in FIG. 12) may be advantageously moved into the inside of the frame 20, with downwardly open hooks 210 supported on upwardly open hooks 212 on the frame 20. The hooks 210, 212 may be tapered, such as illustrated, to ensure a secure, rattle free attachment. Tabs 220 on or near the top of the heat exchanger 40, 42 (e.g., secured to the upper collecting tank 50a) have openings therethrough aligned with openings 224 on the frame 20 (e.g., on the vertical frame brace 230; see FIG. 2), and are secured to the frame by a suitable connector 140 or the like such as previously described. The tabs 220 may be upwardly extending as illustrated in FIG. 12, or may extend laterally from the sides of the collecting tanks (e.g., 50a or 52a, 52b). Further, it should be understood that the downwardly open hooks 210 could, alternatively, advantageously be secured to other portions of the frame 20 including, for example, a portion of the braces 100.

It should thus be appreciated that the overlapping hooks 210, 212 may advantageously secure the heat exchangers 40, 42 in the direction of air flow 240, such that the connectors 140 will advantageously be required only to withstand forces transverse to the axial direction of the connector stem 172. Of course, many transverse forces will also be withstood as a result of the heat exchangers 40, 42 being enclosed on the sides by the walls of the frame 20.

It should thus now be appreciated that the fastening points such as described above may be advantageously designed or arranged so that the largest admissible force vector resulting from the fastening forces occurs across the axial direction of the stem 172 of the connector 140, 140a, 140b, which shear forces can be readily taken up by such connectors 140, 140a, 140b. In order to permit compensation of fastening forces acting from other directions, the other fastening points (without connectors) may be designed accordingly. These therefore prevent the fastening points with connectors from being exposed to unduly strong loads or overloads in the direction of the stem 172 of the connector 140, 140a, 140b. If two fastening points with connectors are provided per heat exchanger, the opening in the mount of the heat exchanger at one fastening point may be designed as an elongated hole or the like so that expansion caused by heat, which can occur across the stem 172 of the connector 140, 140a, 140b, is permitted.

Thus, it should also be appreciated that connectors 140 such as illustrated in FIGS. 10–11 may be securely mounted to maintain the assembly of heat exchangers 40, 42, 44 on the frame 20. In that respect, it should be appreciated that the disconnecting forces which the connectors 140, 140a, 140b as illustrated in the various configurations of FIGS. 4–9 will encounter during use will essentially be transverse to the direction of the connector stem 172. For example, any force on the heat exchanger 44 in FIGS. 4–7 which is axial to the connector stem 172 will be counteracted by the sides of the slots 124, 124a. Further, any such force in the FIGS. 8–9 will be lateral to the frame 20, and the overlapping of the side flanges 158 with opposite sides of the frame 20 will similarly counteract such forces as might otherwise tend to bias the connectors 140b toward removal.

It should thus further be appreciated that the connectors 140 may be secured in the openings so that they may be relatively easily inserted or removed when desired during assembly or disassembly. Thus, such connectors 140 may be pushed in by an assembler (or easily tapped in with a mallet), and may be pulled out (or simply pried out by use of a screwdriver under the head 170 or flange 178, for example).

Thus, the connector 140 illustrated in FIGS. 10–11 may be readily and advantageously used to provide a secure mounting during stressful uses while at the same time allowing the connector 140 to be easily inserted and removed when desired during assembly and disassembly. However, it should be understood that still other connectors could be advantageously used with the disclosed embodiment while still using various aspects of the present invention.

In accordance with the invention, all fastening points may be situated between the collecting tank of the heat exchangers and the longitudinal and transverse walls of the frame so that the heat exchangers 40, 42, 44 need not be fastened to each other. Because the heat exchangers 40, 42, 44 are only fastened to the frame walls, simple clamps or hooks on the collecting tanks are an adequate means of fastening, for which reason the solutions according to the invention are particularly suited for those applications in which collecting tanks made of metal, for example aluminum, are present, since such clamps or hooks are very easy to mount on the collecting tanks. The effort toward all-metal heat exchangers, which are advantageous because of the better recycling capability, is therefore taken into account. The number of pieces justify the preparation of dies for manufacturing of plastic collecting tanks, but the fastening devices can also be made with extremely limited tooling expense.

Further, the fastening points prescribed for releasably fastening the fan shroud 38 may also be situated only on the frame 20 or only between the frame 20 and the edge of the fan shroud 38. The longitudinal and transverse walls may advantageously end on the face on which the fan shroud is to be mounted in a roughly flat vertical plane, and hooks may be mounted at this plane of the walls in order to be able to suspend the fan shroud 38, which in turn also may have corresponding hooks on its edge, in hooks on the frame walls 22, 24, 26, 28. Those hooks may primarily take up the forces that occur or act in the direction of the cooling air. In addition, one connector per side may be provided with its stem perpendicular to the flow direction of the cooling air, inserted through an opening in the vertical wall 22, 24 and through a corresponding opening in an eye or the like arranged on the fan shroud 38. The forces that occur perpendicular to the direction of the cooling air are trapped by the shape-mating (stops) between the edge of the fan shroud and the faces of the walls.

It should thus be appreciated that, overall, the heat exchange arrangement according to the invention is very robust and can fully fulfill the expectations of users in this respect.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A frame adapted to support a plurality of heat exchangers one in front of another in the direction of flow of cooling air on vehicle support members, at least one of said heat exchangers being generally box shaped with projecting components on opposite sides thereof, comprising:

two vertical walls interconnected at upper and lower ends by two transverse walls;

cross braces between said walls;

fastening points on said walls adapted to fasten said heat exchangers to said frame;

wherein said vertical walls include outwardly extending bulging sections, said bulging sections each including an outer portion adapted to be secured to said vehicle support members to support said frame thereon, and an inner portion defining a space between vertical wall sections above and below said bulging section and adapted to receive said projecting components of said at least one heat exchanger.

2. The frame of claim 1, wherein said outer portions of said bulging sections include downwardly facing surfaces adapted to be secured on top of said vehicle support members.

3. The frame of claim 1, wherein said frame is adapted to support a first of said heat exchangers on one side of said cross braces and to support a second of said heat exchangers on the opposite side of said cross braces.

4. The frame of claim 1, wherein the cross braces are between two of said heat exchangers, and include cross brace sections between said vertical wall sections above and below said bulging section.

5. A heat exchanging element for a vehicle including a plurality of heat exchangers, one in front of another in the direction of flow of cooling air, comprising:

first and second heat exchangers;

connecting flanges on each of said heat exchangers, each of said connecting flanges including an opening therethrough;

a supporting frame, including
two vertical walls interconnected at upper and lower ends by two transverse walls,
cross braces between said walls,
supports securable to support members on said vehicle, and
at least one fastening opening on said walls for each of said heat exchangers,
wherein each of said fastening openings is aligned with said flange openings;

connectors connecting each of said fastening openings to said aligned flange openings, said connectors including a head and a stem with an expandable end opposite said head retaining said connectors in said aligned openings;

outwardly extending bulging sections in said vertical walls, said bulging sections each including said supporting frame supports and defining a space between vertical wall sections above and below said bulging section; and inlet and outlet connectors of said heat exchangers positioned in said space defined by said bulging sections.

6. The heat exchanging element of claim 5, wherein the cross braces are between two of said heat exchangers and include cross brace sections between said vertical wall sections above and below said bulging section.

7. The heat exchanging element of claim 5, wherein said cross braces comprise spaced flat members interconnected by flat bracing members, said flat members and flat bracing members generally lying in planes parallel to the direction of flow of cooling air through said heat exchangers.

8. A heat exchanging element for a vehicle including a plurality of heat exchangers, one in front of another in the direction of flow of cooling air, comprising:

first and second heat exchangers;

connecting flanges on each of said heat exchangers, each of said connecting flanges including an opening therethrough;

a supporting frame, including
two vertical walls interconnected at upper and lower ends by two transverse walls,
cross braces between said walls,
supports securable to support members on said vehicle, and
at least one fastening opening on said walls for each of said heat exchangers,
wherein each of said fastening openings is aligned with said flange openings;

connectors connecting each of said fastening openings to said aligned flange openings, said connectors including a head and a stem with an expandable end opposite said head retaining said connectors in said aligned openings; wherein said cross braces comprise spaced flat members interconnected by flat bracing members, said flat members and flat bracing members generally lying in planes parallel to the direction of flow of cooling air through said heat exchangers, and at least some of said flat members and flat bracing members are oriented to direct air flow toward the corners of said supporting frame.

9. The heat exchanging element of claim 5, further comprising mounts on said frame cooperating with hooks on said heat exchangers to support said heat exchangers on said frame.

10. The heat exchanging element of claim 9, wherein:

said mounts and cooperating hooks support said heat exchangers on said frame in one direction; and said connectors support said heat exchangers on said frame in a second direction;

wherein said first and second directions are not parallel to one another.

11. The heat exchanging element of claim 10, wherein said mounts and cooperating hooks supporting one of said heat exchangers permit thermal expansion in a direction transverse to the stem of the connector connecting the flange opening of said one heat exchanger to said frame.

* * * * *